Oct. 13, 1942.　　　　　J. REMDE　　　　　2,298,412
ELECTRICAL MEASURING INSTRUMENT
Filed Jan. 11, 1940
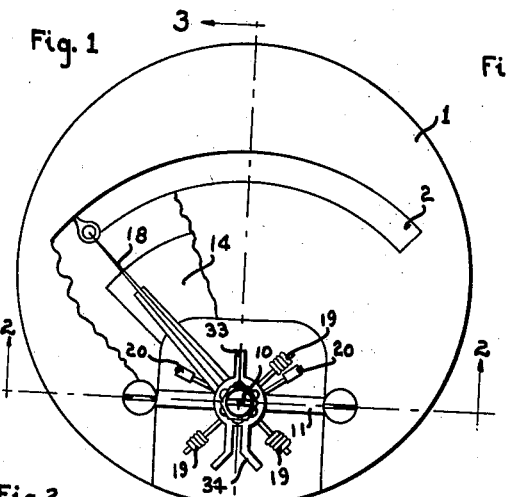
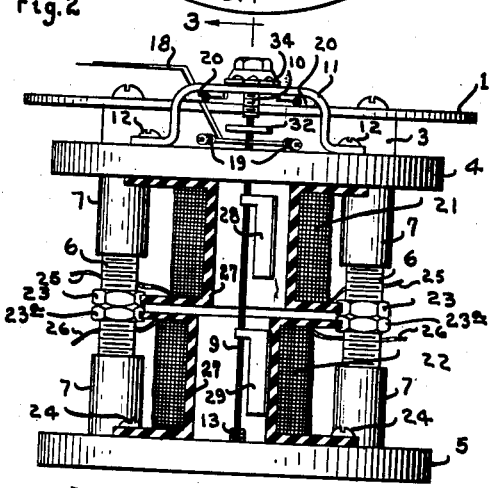
INVENTOR
JACK REMDE
BY
Toulmin & Toulmin
ATTORNEYS Patented Oct. 13, 1942

2,298,412

UNITED STATES PATENT OFFICE 2,298,412

ELECTRICAL MEASURING INSTRUMENT

Jack Remde, Bluffton, Ohio, assignor to R. L. Triplett, Bluffton, Ohio

Application January 11, 1940, Serial No. 313,303

1 Claim. (Cl. 171—95)

The present invention relates to electrical apparatus, and more particularly to instruments for measuring currents and voltages.

In the past, when it has been desired to measure different current values, it has been customary to pass the currents successively through an ammeter which may be of the d'Arsonval type, and note the difference or ratios of the two readings. Sometimes the two currents would be passed through separate meters and their values compared in this manner. However, both methods are somewhat unsatisfactory in that, in the first case, that is using the single meter, considerable time may be taken to connect and disconnect the two circuits or sources of current, whereas in the second case, using two separate meters, there can be no positive assurance, even when the meters are properly calibrated, that the comparison of the two currents is strictly accurate. There was also added the expense of having on hand two or more meters, depending on the number of sources of current which it is desired to measure at any one time.

Again, in the ordinary form of d'Arsonval meter, it is usual to employ a torsional spring to return the pointer to zero in the absence of current flowing through the meter or voltage applied thereto, and the distortion introduced by the spring is compensated for by the calibration of the meter. Regardless of the accuracy with which this calibration is maintained, there is always the possibility that the torsional spring may introduce error in the reading, since it represents a steady pull on the pointer of an amount which at one time may be proportionate to the actuating force of the measured current and at other times may be considerably out of proportion thereto.

The primary object of the present invention is to provide an improved electrical measuring instrument, of a simple and unique design, which will directly translate the ratio and differential of two or more currents or voltages into movements of a single pointer on a dial. Thus the two or more voltages or currents may be applied to a single meter.

Another object is to provide a meter of the magnetic vane type, employing a movable coil and pointer and in which the pointer is brought to its zero position without the use of a torsional spring. However, it will be understood that if desired a torsional spring may be used under circumstances which will be pointed out hereinafter.

Other objects are to provide an electrical meter capable of measuring simultaneously a plurality of currents or voltages and indicating their composite strength or power with a single pointer and dial; to provide a meter adapted to measure quadrature or polyphase currents or voltages simultaneously on a single dial and allowing for differences of phase and frequency.

Other objects and features will be apparent as the specification is perused in connection with the accompanying drawing.

In the drawing:

Figure 1 is a plan view of the improved instrument.

Figure 2 is a cross sectional view, taken on the line 2—2 in Figure 1.

Figure 3 is a partial sectional view taken on the line 3—3 in Figure 1.

Figure 4 is a fragmentary view of the dial, and looking down on the pointer to see the manner in which the pointer is operated.

Figure 5 is a diagrammatic perspective view of the pointer, pointer rod, actuating vanes and the coils of the improved instrument.

Figure 6 is a schematic view showing the interaction between the magnetic fields of the respective coils and the vanes carried by the pointer.

Figure 7 is a fragmentary perspective view of a modified form of the actuation element employing three coils.

Referring to Figures 1 and 2, the numeral 1 represents the dial of the instrument provided with an arcuate slit 2. There may be numbers provided on the dial at the inner or outer edges of the slit (not shown on the drawing). The dial 1 is supported in any suitable manner, for example, by means of a plate 3 from a frame member 4 of insulating material, on which is mounted the upper portion of the instrument proper. There is a lower frame member 5 which is spaced from the upper frame member by means of screw uprights 6, which thread into columns 7 secured to the respective frame members.

The frame member 4 is provided with a large opening 8 (Figure 3) through which a pointer rod 9 extends. The upper end of this rod is pivoted in a jewel bearing contained within a screw 10, the latter being mounted on a bridge member 11 which is screwed at 12 to the frame member 4. The lower end of the rod 9 is pivoted in a jewel bearing contained within the screw member 13, secured in any suitable manner to the lower frame 5. There is an inclosure indicated by the reference numeral 14 secured in any suitable manner to the upper frame member 4, which is completely closed except for an opening 15 through which the rod 9 extends. This inclosure contains an aluminum vane 16 which is secured by a horizontal supporting member 17 to the rod 9. The purpose of this vane is simply to dampen the oscillations of the rod 9 by the retarding effects of the air currents introduced by the vane within the inclosure.

To the rod 9 there is secured a pointer 18, bent in any suitable manner to clear the frame, this rod constituting part of a quadrant structure, of which the other three legs are equidistantly spaced and carry coutnerweights 19, as is well understood in the art. Bumper arms 20 are also provided to limit the angle of movement of the pointer 18. The actuating mechanism for the pointer is constituted of a pair of coils 21, 22, the first of which is secured to the under side of the frame 4 by screws 12 and the opposite end is secured in any suitable manner to the nuts 23, which are screwed to the proper height on the screw uprights 6. The lower coil 22 is secured to the lower frame member 5 by the screws 24, and the upper end of the coil is held in place by any suitable mechanical connection to the screws 23ª, which have been adjusted to the proper height on the screw uprights 6. Wires 25 are taken from the upper coil, and wires 26 from the lower coil, to terminals positioned in any suitable place on the meter. The coils 21, 22 are in the form of solenoids, as can be seen more clearly in Figure 5, and preferably are wound on spools 27 of Bakelite, as can be seen more clearly in Figure 2. It will be noted that the coil 22 is moved slightly to the left from the coil 21, for reasons which will appear hereinafter.

In addition to the pointer 18, the rod 9 also carries one or more iron vanes 28, 29 (Figures 2 and 3) which cooperate with stationary vanes or pole pieces 30, 31 secured in any suitable manner to the interior of the coils 21, 22, respectively. These vanes are made of soft iron, and as can be seen more clearly from Figures 5 and 6, are located at different positions with respect to the movable vanes 28, 29 carried by the rod 9. The shaft 9 is preferably made of non-magnetic material, such as insulating material (as indicated by the solid black section) to minimize or prevent magnetic interference between the vanes 28, 29. Under certain circumstances it may be desirable to provide a torsional spring 32, the inner end of which is secured to the rod or shaft 9 and the outer end is attached to the arm 33 of an adjusting lever 34. The latter is mounted on the axis of the shaft 9, and the arrangement is such that as the lever is rotated slightly in either direction the torsional spring is either tightened or loosened and the pressure applied to the pointer 18 accordingly adjusted. This spring serves to return the pointer to zero position.

In stead of employing two coils and two sets of vanes associated with a pair of pole pieces, I may use any number of coils and a corresponding number of vanes and pole pieces. Thus in Figure 7 there are illustrated three coils 35, from which runs a common shaft 36 provided with a pointer 37. The shaft is supported between a pair of jewel bearings 38. The coils 35 are provided with pole pieces 39, and in the two upper coils the pole pieces have the same corresponding position, but in the lower coil the pole piece is considerably removed from the other pole pieces, as was the case with the pole piece 31 in Figures 5 and 6. The shaft 36 carries a plurality of vanes 40, preferably in the same relative position radially of the shaft, each of said vanes cooperating magnetically with the respective pole pieces on the coils. Separate wires 41 are taken from each of the coils to terminals conveniently located on the instrument. The coils 34 are normally concentrically arranged as illustrated, but as in the case of coil 22 shown in Figure 2, one or more of the coils may be displaced slightly from the concentric position. The purpose of this displacement will appear after the operation of the device has been described.

*Operation*

The purpose of the instrument is practically universal in that all kinds of currents and voltages may be applied to any one or all of the coils, and the magnetic effect introduced by these currents or voltages is compositely added or differentiated depending on the direction of the current in the respective coils, and translated into movement of the pointer 18 due to the composite or differentiated magnetic forces acting on the respective movable vanes 28, 29, etc. The separate fixed vanes or pole pieces 30, 31 are so disposed in the respective magnetic fields as to set up opposed forces when excited by their respective magnetic field coils.

Among typical examples as to the use of the improved instrument, there may be mentioned the application of direct current to one of the coils and alternating current to the other coil, or the comparison of currents of differing frequencies or phase relation for power factor measurements where one coil would supply the controlling torque and the other coils the reactive and inphase components, respectively, as in the case of the three-coil modification.

In case it is desired to measure the differential value between two direct current voltages, one of the voltages may be applied to one of the coils in such a way as to cause the pointer 18 to move to the left, and the other voltage may be applied to another coil as to tend to cause the pointer to move to the right. Assuming the latter voltage is the greater, then the position taken by the pointer on the dial will give a direct reading in voltage, if desired, of the voltage difference between the two voltages applied to the respective coils. This differential voltage may also be determined by applying the respective voltages to the coils in such a way that the pointer moves in the same direction for each voltage. In this case the voltages would be applied successively, noting the position taken by the pointer after each application of voltage. In the latter case it would be desirable to employ the torsional spring 32 since when the latter is employed the application of two voltages to the respective coils gives a differential reading to those voltages and the spring will serve to restore the pointer to its zero position when the voltages are withdrawn.

If the ratio of two voltages is desired, then the spring 32 should be discarded so that the reaction between the vanes 28, 29 to the respective pole pieces 30, 31 represents absolute magnetic force brought about directly by the magnetic fields of the respective currents or voltages applied to the coils. By the use of two or more separate coils, the magnetic fields of which operate on individual pole pieces which cause a common actuation of the pointer shaft, it may be entirely possible to eliminate the torsional spring 32 for restoring the pointer to zero and utilize one of the coils exclusively for this purpose.

Thus no inaccuracies of measurement are introduced by the steady rotational force exerted by the spring, which force may not bear the same proportion to the magnetic force generated by one current or voltage as it would to the magnetic force generated by another current or voltage.

The three-coil modification shown in Figure 7 lends itself readily to the measurement of three-phase voltages or currents, and it will be understood that if desired, as many coils and vanes may be provided, in accordance with the present invention, as there are phases to be measured. The use of two or more actuating coils, exercising their individual magnetic effects on a common pointer shaft, may also be advantageous where it is desired to compensate for any known irregularity in the pointer movement. For example, one of the coils may be moved slightly off the center of the axis of rotation of the pointer rod to introduce a compensating effect in the operation of the instrument, or if desired, compensation may be obtained through varying the shape, size or position of one or more of the respective vanes or pole pieces.

While I have described my invention more particularly in connection with an instrument for measuring currents or voltages of different character, the invention is not limited to such an instrument. Indeed, many other uses for the improved device will occur to those skilled in the art.

It will be understood that I desire to comprehend within the invention such modifications as come within the scope of the claim and the invention.

Having thus fully described my invention, what I claim as new and desire to secure by Letters Patent, is:

A voltage-measuring instrument comprising a casing containing a plurality of solenoids arranged end to end, conductors brought out from each solenoid to separate terminals on the casing, a common pointer shaft extending through the solenoids, a pole piece secured to the interior of each solenoid and extending toward said shaft, and metal vanes extending outwardly from said shaft and positioned in each of the solenoids whereby the vanes magnetically cooperate with the respective pole pieces to produce a composite rotational effort on the shaft when the solenoids are excited by separate voltages, said shaft being constituted of insulating material to minimize magnetic effects between the vanes, one of said solenoids being concentrically mounted with respect to said shaft and another of said solenoids being eccentrically mounted, the said metal vanes being rigidly attached to the said insulating shaft thus serving to prevent magnetic interference between said coils and vanes, the said shaft being of one piece of insulating material and its ends forming bearing elements, and a pointer mounted on said insulating shaft.

JACK REMDE.